United States Patent
Desjardins

(10) Patent No.: US 12,092,039 B2
(45) Date of Patent: Sep. 17, 2024

(54) REDUCTION GEARBOX FOR GAS TURBINE ENGINE

(71) Applicant: Pratt & Whitney Canada Corp., Longueuil (CA)

(72) Inventor: Michel Desjardins, St-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/143,996

(22) Filed: May 5, 2023

(65) Prior Publication Data
US 2023/0358177 A1 Nov. 9, 2023

Related U.S. Application Data

(63) Continuation-in-part of application No. 18/138,508, filed on Apr. 24, 2023, which is a continuation of
(Continued)

(51) Int. Cl.
*F02C 7/36* (2006.01)
*F02C 3/107* (2006.01)
(Continued)

(52) U.S. Cl.
CPC .............. *F02C 7/36* (2013.01); *F02C 3/107* (2013.01); *F02C 6/206* (2013.01); *F02C 7/32* (2013.01);
(Continued)

(58) Field of Classification Search
CPC ....... F16H 1/28; F16H 2001/2872–289; F16H 57/08; F02C 7/32; F02C 7/36;
(Continued)

(56) References Cited

U.S. PATENT DOCUMENTS

| 3,776,067 A | 12/1973 | Debruyne |
| 8,376,899 B2 * | 2/2013 | Davies .................... F16H 57/10 475/900 |

(Continued)

FOREIGN PATENT DOCUMENTS

| CN | 106090140 A | * 11/2016 | ........... F16H 1/2863 |
| CN | 209977189 U | 1/2020 | |

(Continued)

Primary Examiner — Steven M Sutherland
(74) Attorney, Agent, or Firm — Getz Balich LLC

(57) ABSTRACT

A reduction gearbox is provided that includes a planetary gear arrangement disposed in a casing. The planetary gear arrangement includes a sun gear, planet gear assemblies, and fore and aft ring gears. The sun gear is configured for communication with an input. Each planet gear assembly has a main gear meshed with the sun gear, fore and aft lateral gears disposed on opposite sides of the main gear and rotating therewith. The main gear has a main gear pitch diameter and the fore and aft lateral gears having a lateral gear pitch diameter. The fore ring gear is meshed with the fore lateral gears. The aft ring gear is meshed with the aft lateral gears. The aft ring gear is independent of the fore ring gear. The planet gear assemblies are in communication with an output. The fore and aft ring gears are mechanically engaged with the casing.

15 Claims, 14 Drawing Sheets

Related U.S. Application Data application No. 17/519,963, filed on Nov. 5, 2021, now Pat. No. 11,635,029, which is a continuation of application No. 15/429,976, filed on Feb. 10, 2017, now Pat. No. 11,174,782.

(51) Int. Cl.

| | | |
|---|---|---|
| *F02C 6/20* | (2006.01) | |
| *F02C 7/32* | (2006.01) | |
| *F02K 3/06* | (2006.01) | |
| *F16H 1/28* | (2006.01) | |
| *F16H 57/08* | (2006.01) | |

(52) U.S. Cl.
CPC ............... *F02K 3/06* (2013.01); *F16H 1/28* (2013.01); *F16H 57/08* (2013.01); *F05D 2260/40311* (2013.01); *F16H 2001/2881* (2013.01); *F16H 2001/289* (2013.01); *Y02T 50/60* (2013.01)

(58) Field of Classification Search
CPC .. F02C 3/107; F02C 6/206; F02K 3/06; F05D 2260/40311; Y02T 50/60
See application file for complete search history.

(56) References Cited

U.S. PATENT DOCUMENTS

| | | |
|---|---|---|
| 10,006,520 B2 | 6/2018 | Ligata |
| 10,119,465 B2 | 11/2018 | Sheridan |
| 11,111,985 B1 | 9/2021 | Francis |
| 2019/0218969 A1* | 7/2019 | Fulleringer ............... F02C 7/36 |

FOREIGN PATENT DOCUMENTS

| | | |
|---|---|---|
| CN | 115711284 A | 2/2023 |
| GB | 1116791 A | 6/1968 |

* cited by examiner

REDUCTION GEARBOX FOR GAS TURBINE ENGINE

This application is a continuation-in-part of U.S. patent application Ser. No. 18/138,508 filed Apr. 24, 2023, which is a continuation of U.S. patent application Ser. No. 17/519,963 filed Nov. 5, 2021, now issued as U.S. Pat. No. 11,635,029, which is a continuation of U.S. patent application Ser. No. 15/429,976 filed Feb. 10, 2017, now issued as U.S. Pat. No. 11,174,782, all of which are hereby incorporated by reference herein in their entirety.

BACKGROUND OF THE INVENTION

1. Technical Field

The application generally relates to aircraft engines and, more particularly, to gearboxes used in an aircraft engine such as a gas turbine engine.

2. Background Information

Turboprops are gas turbine engines coupled to a propeller via a reduction gearbox. Contrary to a turbofan engine, in which energy from the jet is used to generate thrust, a turboprop turbine converts this energy in mechanical energy. The turbine is then used to drive the propeller. However, the rotational speed of the turbine is too high to be directly coupled to the propeller. Accordingly, a reduction gearbox is used to reduce the rotational speed of the propeller relative to the turbine and to increase the torque generated by the turbine. Gearboxes add weight and complexity to the engine, and room for improvement exists.

SUMMARY

According to an aspect of the present disclosure, a reduction gearbox is provided that includes a casing and a planetary gear arrangement. The planetary gear arrangement is disposed in the casing. The planetary gear arrangement includes a sun gear, a plurality of planet gear assemblies, a fore ring gear, and an aft ring gear. The sun gear is configured for communication with an input. Each planet gear assembly has a main gear meshed with the sun gear, a fore lateral gear and an aft lateral gear disposed on opposite sides of the main gear and rotating therewith. The main gear has a main gear pitch diameter and the fore and aft lateral gears having a lateral gear pitch diameter. The fore ring gear is meshed with the fore lateral gears. The aft ring gear is meshed with the aft lateral gears, and the aft ring gear is independent of the fore ring gear. The planet gear assemblies are in communication with an output. The fore ring gear and the aft ring gear are mechanically engaged with the casing.

In any of the aspects or embodiments described above and herein, the fore and aft ring gears each have an outer radial surface, and each may include one or more male mechanical features that extend outwardly from the outer radial surface and engage with respective mating female features disposed within the casing.

In any of the aspects or embodiments described above and herein, the one or more male mechanical features may be gear teeth disposed around a circumference of the respective ring gear, and the respective mating female features may be configured to receive the gear teeth.

In any of the aspects or embodiments described above and herein, the gear teeth may be configured as helical gear teeth or as spur gear teeth.

In any of the aspects or embodiments described above and herein, the gear teeth extending outwardly from the outer radial surface of the fore ring gear and the gear teeth extending outwardly from the outer radial surface of the aft ring gear may be configured to permit circumferential clocking alignment between the fore ring gear and the aft ring gear.

In any of the aspects or embodiments described above and herein, the one or more male mechanical features may be a key extending out from the outer radial surface of the respective ring gear and the respective mating female features disposed within the casing may be a keyway disposed in the casing that mates with the key.

In any of the aspects or embodiments described above and herein, the fore and aft ring gears each have an outer radial surface, and each may include a keyway disposed in their respective outer radial surface, and the casing may include a first key configured to be received within the keyway of the fore ring gear and a second key configured to be received within the keyway of the aft ring gear.

In any of the aspects or embodiments described above and herein, the fore and aft ring gears may each include an attached flange configured for attachment to the casing using a mechanical fastener. The attached flange may be configured such that an outer radial surface of the respective ring gear abuts the casing. The attached flange may be configured such that an outer radial surface of the respective ring gear is separated a distance from the casing. The attached flange may have a U-shaped portion.

According to an aspect of the present disclosure, a reduction gearbox is provided that includes a casing and a planetary gear arrangement. The planetary gear arrangement is disposed in the casing. The planetary gear arrangement includes a sun gear, a plurality of planet gear assemblies, a fore ring gear, and an aft ring gear. The sun gear is configured for communication with an input. Each planet gear assembly has a main gear meshed with the sun gear, a fore lateral gear and an aft lateral gear disposed on opposite sides of the main gear and rotating therewith. The main gear has a main gear pitch diameter and the fore and aft lateral gears have a lateral gear pitch diameter. The fore ring gear is meshed with the fore lateral gears. The aft ring gear is meshed with the aft lateral gears. The aft ring gear is independent of the fore ring gear. The planet gear assemblies are in communication with an output. The fore and aft ring gears are attached to the casing by a flange. The respective flange extends out from the respective ring gear in a manner such that respective ring gear is separated a distance from the casing.

According to an aspect of the present disclosure, a gas turbine engine is provided that includes a compressor, a combustor, and a turbine in communication with the compressor and a reduction gearbox. The reduction gearbox includes a casing and a planetary gear arrangement. The planetary gear arrangement is disposed in the casing. The planetary gear arrangement includes a sun gear, a plurality of planet gear assemblies, a fore ring gear, and an aft ring gear. The sun gear is configured for communication with an input. Each planet gear assembly has a main gear meshed with the sun gear, a fore lateral gear and an aft lateral gear disposed on opposite sides of the main gear and rotating therewith. The main gear has a main gear pitch diameter and the fore and aft lateral gears having a lateral gear pitch diameter. The fore ring gear is meshed with the fore lateral gears. The aft ring gear is meshed with the aft lateral gears.

The aft ring gear is independent of the fore ring gear. The planet gear assemblies are in communication with an output. The fore and aft ring gears are mechanically engaged with the casing.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
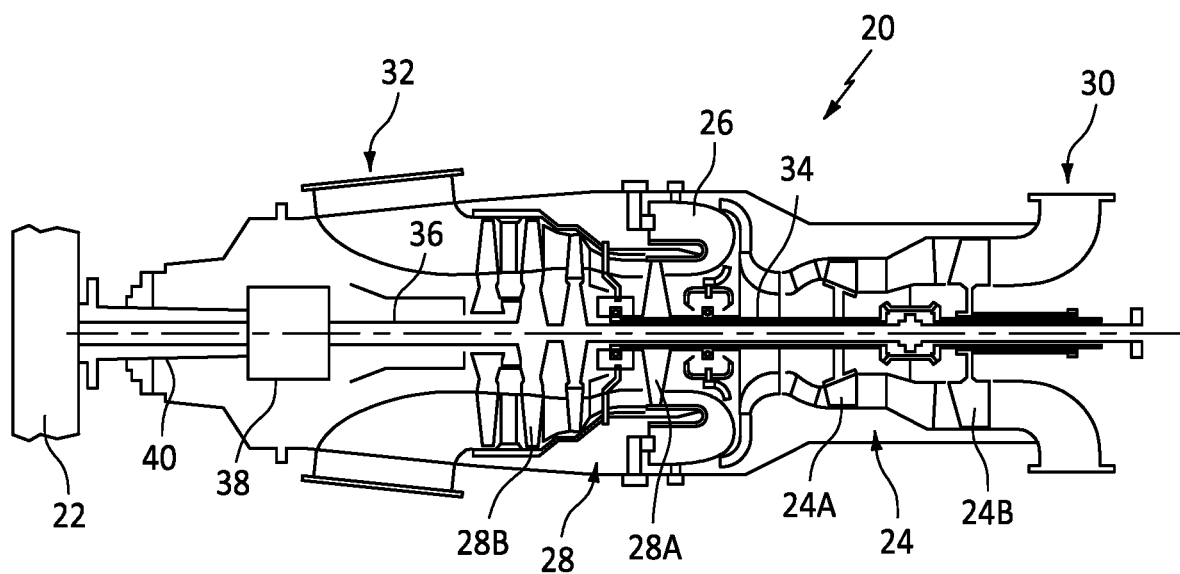
FIG. 1 is a schematic cross-sectional view of a gas turbine engine embodiment.

FIG. 1 illustrates a gas turbine engine 20 configured for driving a load 22, such as, but not limited to, a propeller or a helicopter rotor. Depending on the intended use, the engine 20 may be any suitable aircraft engine, and may be configured as a turboprop engine or a turboshaft engine. The gas turbine engine 20 generally comprises in serial flow communication a compressor section 24 for compressing inlet air, a combustor 26 in which the compressed air is mixed with fuel and ignited for generating an annular stream of hot combustion gases, and a turbine section 28 for extracting energy from the combustion gases.

The exemplary engine 20 embodiment shown in FIG. 1 is a "reverse-flow" engine because gases flow from the inlet 30, at a rear portion of the engine 20, to the exhaust outlet 32, at a front portion of the engine 20. This is in contrast to "through-flow" gas turbine engines in which gases flow through the core of the engine 20 from a front portion to a rear portion. The engine 20 may be a reverse-flow engine (as illustrated) or a through-flow engine.

In the illustrated embodiment, the turbine section 28 has a high-pressure turbine 28A in communication with a high-pressure compressor 24A via a high-pressure shaft 34, and a low-pressure turbine 28B in communication with a low-pressure compressor 24B via a low-pressure shaft 36. A reduction gearbox 38 is configured to connect the low-pressure shaft 36 to an output shaft 40 that is in driving engagement with a load 22 (e.g., a propeller, a helicopter rotor, or the like) while providing a reduction speed ratio therebetween.

Referring to FIGS. 1-4, the reduction gearbox 38 comprises a planetary gear arrangement 42 disposed within a stationary casing 44. The planetary gear arrangement 42 (sometimes referred to as an epicyclic gear train, or an epicyclic gearbox, etc.) includes a sun gear 46, a plurality of planet gear assemblies 48, and at least one ring gear 50. As detailed herein, the planetary gear arrangement 42 is in communication with an input shaft 52 and an output shaft 40, and the input and output shafts 52, 40 may be disposed on the same rotational axis. The planetary gear arrangement 42 shown in FIGS. 2-4 includes a pair of ring gears 50A, 50B that are independent of one another. The planetary gear arrangement 42 allows the load 22 (see FIG. 1; e.g., a propeller, a rotor blade, or the like) to be driven at a given rotational speed, which is different than the rotational speed of the low-pressure shaft 36. In the embodiment shown, the reduction gearbox 38 is axially mounted at the front end of the engine 20. The stationary casing 44 encloses the planetary gear arrangement 42 and is configured to accept an input shaft 52 and an output shaft 40 or components respectively in communication therewith. The input shaft 52 may be the low-pressure shaft 36 or may be an intermediary structure (e.g., an intermediary structure that includes a layshaft 54) in communication with the low-pressure shaft 36. The output shaft 40 may be a structure that is directly connected to the load 22 or may be an intermediary structure that is in communication with the load 22. The present disclosure is not limited to any particular output shaft 40 or input shaft 52 configuration. Examples of input and output shafts 52, 40 are detailed herein.

The sun gear 46 has a pitch diameter ($P_{DSG}$) and is configured with teeth disposed circumferentially around its outer diameter. In some embodiments, the sun gear teeth may be configured as a spur gear. The sun gear 46 is in driving communication with the input shaft 52. For example, the sun gear 46 may be in communication with a sun gear connector 56, and the sun gear connector 56 may be connected with a layshaft 54 that is in communication with the low-pressure shaft 36. In this example, the sun gear connector 56 and the layshaft 54 collectively form the input shaft 52. The layshaft 54 may have a first end lengthwise opposite a second end. The first lengthwise end of the layshaft 54 may be in splined communication with the low-pressure shaft 36, the second lengthwise end may be attached to the sun gear connector 56, and the sun gear connector 56 is in communication with the sun gear 46. In some embodiments, the sun gear 46 may be in direct communication with (e.g., mounted on) the layshaft 54 that is in communication with the low-pressure shaft 36. For example, the first lengthwise end of the layshaft 54 may be in splined communication with the low-pressure shaft 36 and the sun gear 46 may be mounted onto the layshaft 54 proximate the second lengthwise end of the layshaft 54. In some embodiments, the sun gear 46 and layshaft 54 may be integrally formed with a splined configuration disposed at the first lengthwise end of the integral sun gear 46/layshaft 54 for engagement with the low-pressure shaft 36, and the sun gear 46 may be integrally formed at the second lengthwise end of the layshaft 54. In these latter two examples, the layshaft 54 forms the input shaft 52. As indicated above, the present disclosure is not limited to any particular arrangement for providing driving communication between the sun gear 46 and the low-pressure shaft 36.

Figure 2:
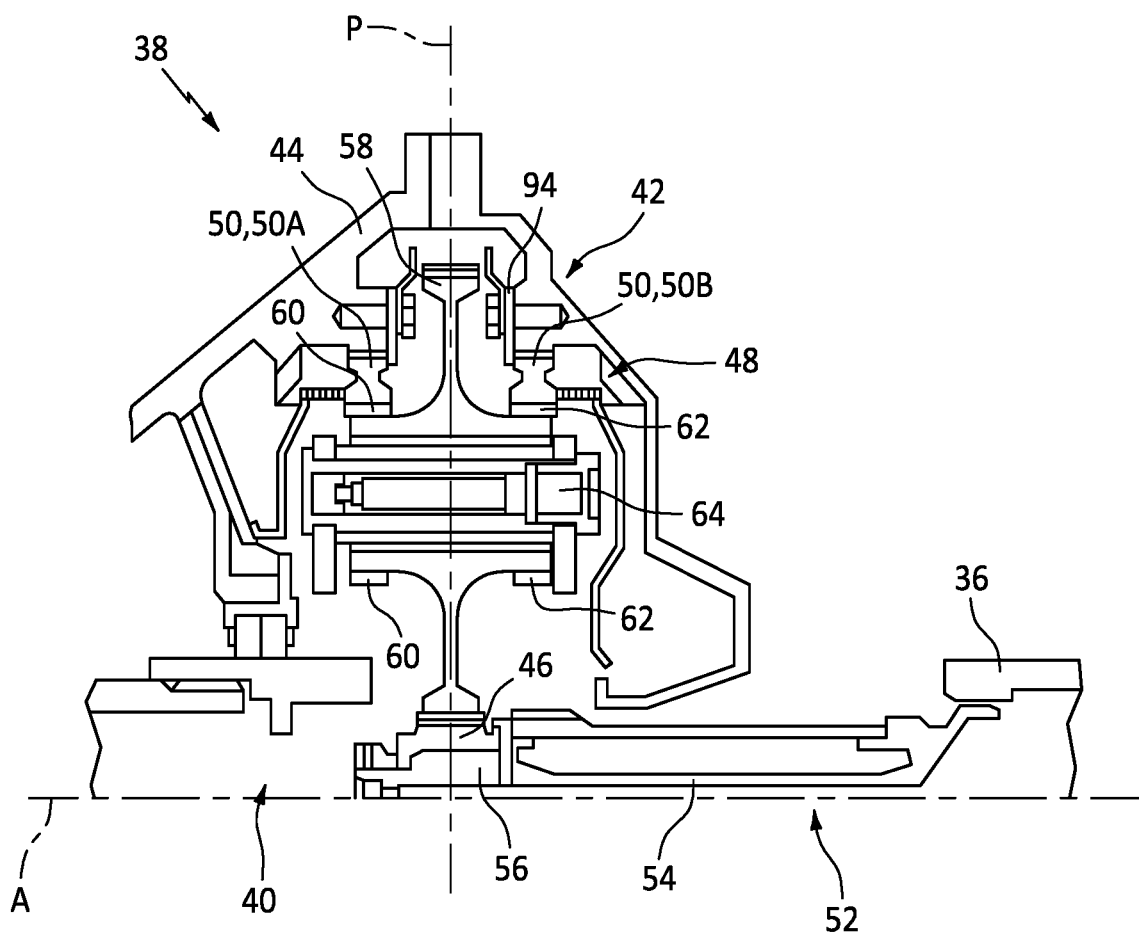
FIG. 2 is a diagrammatic cross-sectional view of a portion of the gas turbine engine shown in FIG. 1, illustrating a planetary gear arrangement.
Figure 3:
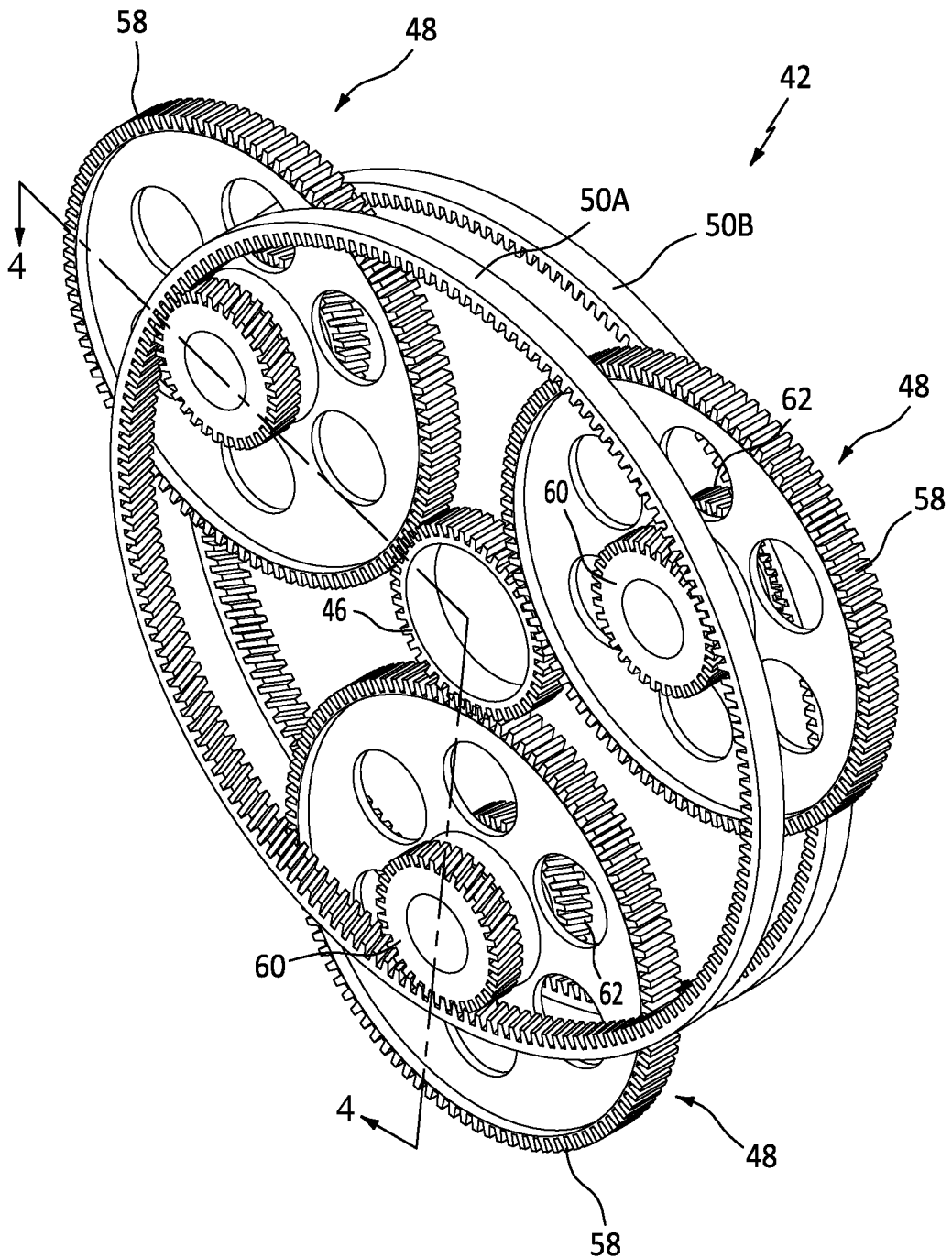
FIG. 3 is a diagrammatic perspective view of a planetary gear arrangement embodiment.

In some embodiments (e.g., like that shown in FIGS. 2 and 10), the input shaft 52 is configured and disposed such that the end of the input shaft 52 (and sun gear connector 56 when included) in communication with the sun gear 46 is permitted to "float"; e.g., some amount of axial and radial movement is permitted. As can be seen in FIG. 2, the floating sun gear 46 is disposed proximate the end of a cantilevered structure (i.e., the sun gear connector 56 attached to the end of the layshaft 54) and is thereby configured to permit some amount of radial and axial movement. The floating is helpful in alleviating an amount of meshing error that may exist within the planetary gear arrangement 42 by allowing the gears to find the center of rotation by gear mesh equilibrium. In those embodiments that include a splined connection between the layshaft 54 and the low-pressure shaft 36, the splined connection provides an amount of axial freedom that accommodates some amount of misalignment that may exist. The planetary gear arrangement 42 may include a retaining ring (not shown), or other structure, that limits the amount of relative axial travel between the layshaft 54 and the low-pressure shaft 36.

In those embodiments that include a layshaft 54, the layshaft 54 may be configured to allow some amount of twist along its rotational axis. The twist of the layshaft 54 may be monitored to provide information regarding the actual torque being transmitted through the layshaft 54.

Figure 5:
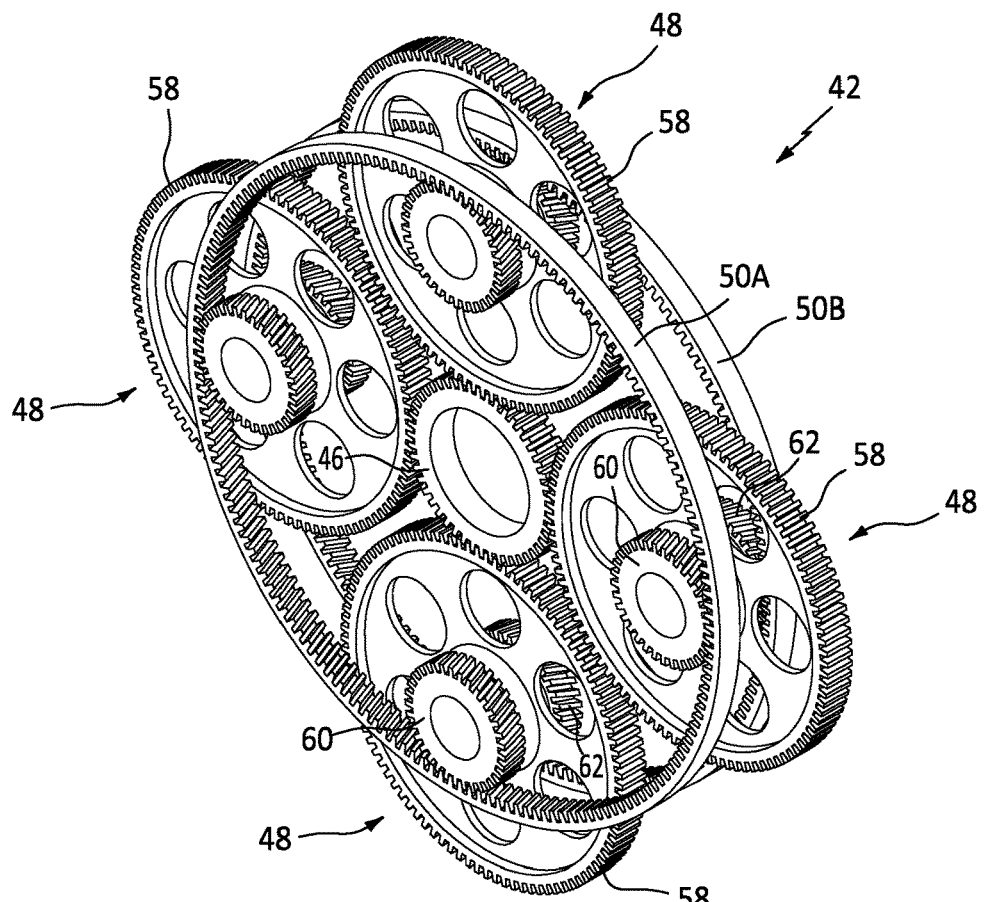
FIG. 5 is a diagrammatic perspective view of a planetary gear arrangement embodiment.

The planetary gear arrangement 42 diagrammatically illustrated in FIG. 2 and described herein includes three planet gear assemblies 48. Present disclosure planetary gear arrangement 42 embodiments may alternatively include fewer than three planet gear assemblies 48 or more than three planet gear assemblies 48. As an example, FIG. 5 diagrammatically illustrates a planetary gear arrangement 42 that includes four planet gear assemblies 48.

Each planet gear assembly 48 includes a main gear 58, a fore lateral gear 60, and an aft lateral gear 62. Each planet gear assembly 48 is rotatably mounted on a shaft 64. The fore and aft lateral gears 60, 62 are disposed on opposite sides of the main gear 58 and are attached to the main gear 58 such that the fore and aft lateral gears 60, 62 and the main gear 58 share a rotational axis and are driven together. The main gear 58 has a pitch diameter ($P_{DMG}$) and the fore and aft lateral gears 60, 62 each have a pitch diameter ($P_{DLG}$). In some embodiments, the fore and aft lateral gears 60, 62 and the main gear 58 may be a monolithic structure. In some embodiments, the fore and aft lateral gears 60, 62 may be independent of and attached to the main gear 58 to form a unitary structure. The main gear 58 of each planet gear assembly 48 is configured to mesh with the sun gear 46. In some embodiments, the main gear 58 may be configured as a spur gear configured to mesh with a sun gear 46 configured as a spur gear. In some embodiments, the fore lateral gear 60 of each respective planet gear assembly 48 may be configured as a helical gear configured to mesh with a respective fore ring gear 50A configured as a helical gear, and the aft lateral gear 62 of each respective planet gear assembly 48 may be configured as a helical gear configured to mesh with a respective aft ring gear 50B configured as a helical gear.

Figure 6:
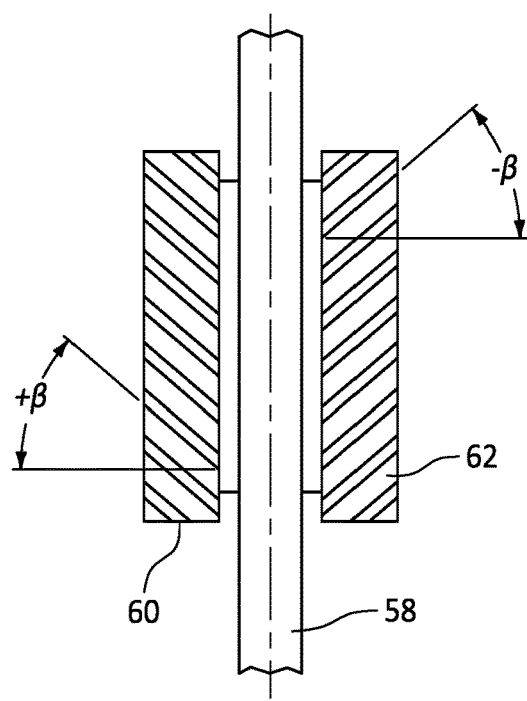
FIG. 6 is a diagrammatic sectional view of a planet gear assembly.

In those embodiments wherein the fore and aft lateral gears 60, 62 are configured as helical gears, the teeth of the respective fore lateral gears 60 may be angled in a first orientation and the teeth of the respective aft lateral gears 62 may be angled in a second orientation, oppositely mirroring the first orientation; e.g., as diagrammatically shown in FIG. 6. FIG. 6 illustrates the teeth of a fore lateral gear 60 disposed in a first orientation with the teeth disposed at an angle $+\beta$ relative to the rotational axis of the planet gear assembly 48, and the teeth of an aft lateral gear 62 disposed in a second orientation with the teeth disposed at an angle $-\beta$ relative to the rotational axis of the planet gear assembly 48. In some embodiments, the fore lateral gear 60 of each respective planet gear assembly 48 may be configured as a spur gear configured to mesh with a respective fore ring gear 50A configured as a spur gear, and the aft lateral gear 62 of each respective planet gear assembly 48 may be configured as a spur gear configured to mesh with a respective aft ring gear 50B configured as a spur gear.

As will be detailed herein, in some embodiments (e.g., like that diagrammatically shown in FIG. 4), the shaft 64 of each planet gear assembly 48 may be connected to a planet carrier 66. In these embodiments, the planet gear assemblies 48 may be described as being mounted with the planet carrier 66. In some embodiments, the shaft 64 of at least one planet gear assembly 48 may not be connected to a planet carrier 66 and that planet gear assembly 48 is not mounted with the planet carrier 66. Each planet gear assembly 48 rotates relative to its respective shaft 64. The planet carrier 66 is configured to connect the planetary gear arrangement 42 to an output shaft 40 which is in turn connected to the load 22. The planet carrier 66 may be in direct communication with the output shaft 40 or maybe in indirect communication with an output shaft 40 via a connector. The present disclosure is not limited to any particular arrangement for connecting the planet carrier 66 with the output shaft 40. In some embodiments, the planet carrier 66 may be a zero-twist carrier to reduce twist deflection under torque by driving the planet gear assemblies 48 from an axial position corresponding to a plane of symmetry of the planet gear assemblies 48. An example of a zero-twist carrier that may be used is disclosed in U.S. Pat. No. 6,663,530 which is hereby incorporated by reference herein in its entirety.

Figure 4:
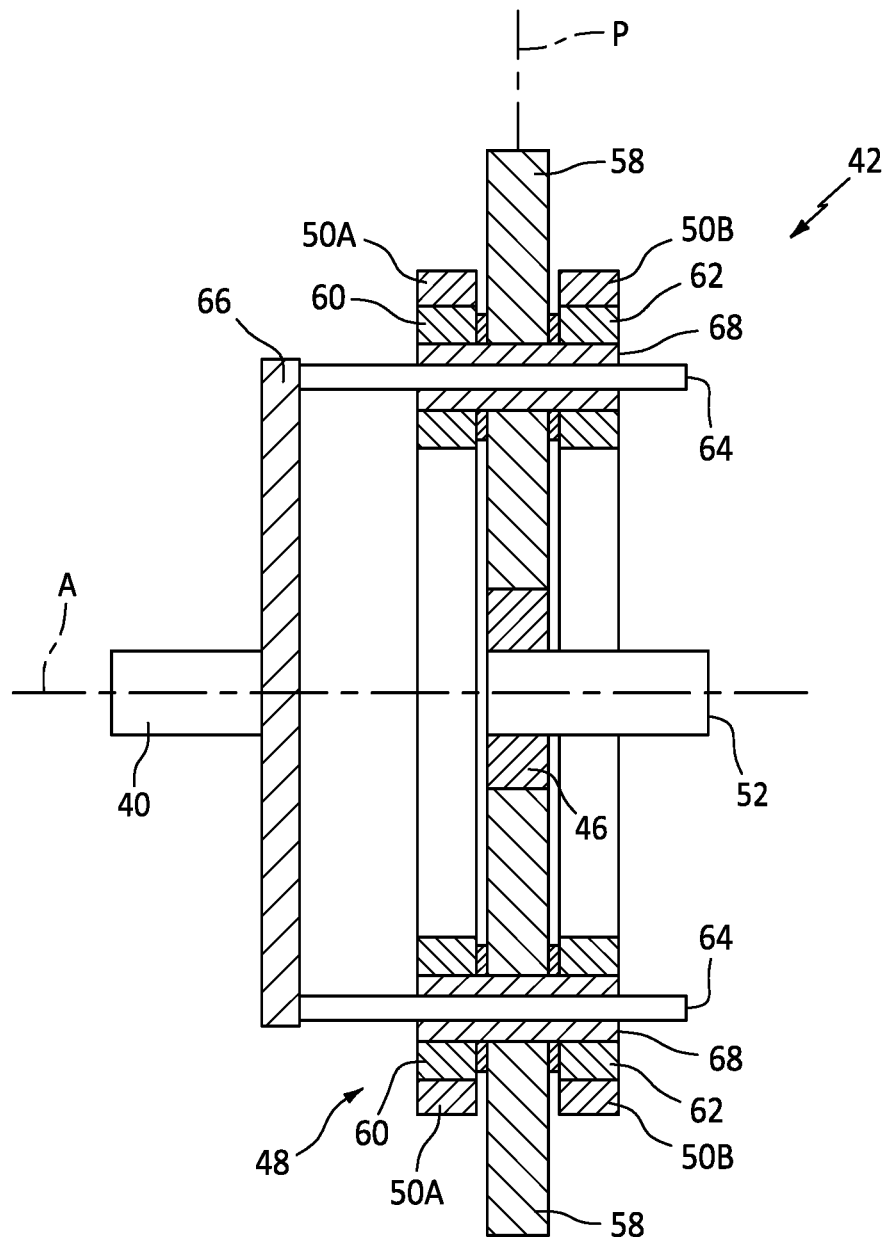
FIG. 4 is a diagrammatic sectional view along line 4-4 of the planetary gear arrangement shown in FIG. 3.

One or more bearings 68 may be disposed between a shaft 64 and a respective planet gear assembly 48. In FIG. 4, a bearing 68 is diagrammatically shown disposed between the shaft 64 and the planet gear assembly 48. The present disclosure is not limited to any particular type of bearing 64, and examples of acceptable bearing 64 types include journal bearings, oil film bearings, roller bearings, and the like.

Figure 7A:
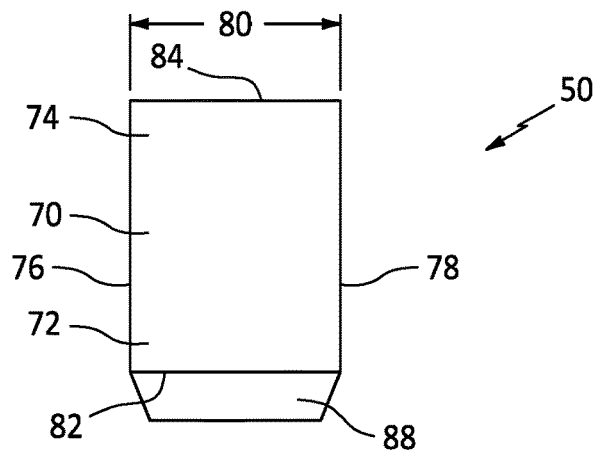
FIGS. 7A-7F are diagrammatic cross-sectional view of ring gear embodiments.
Figure 7B:
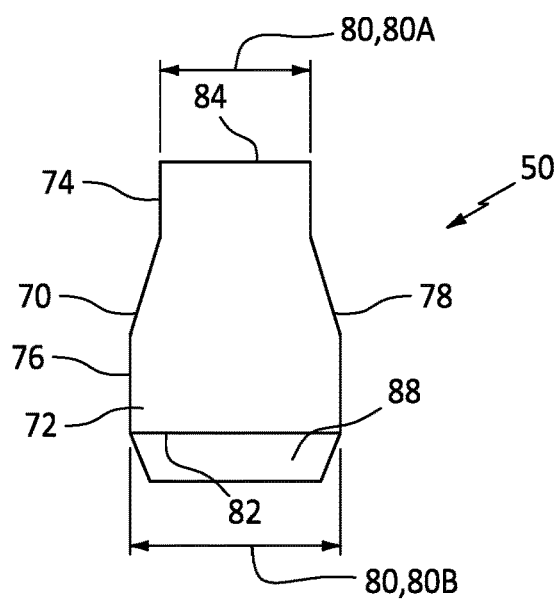
Figure 7C:
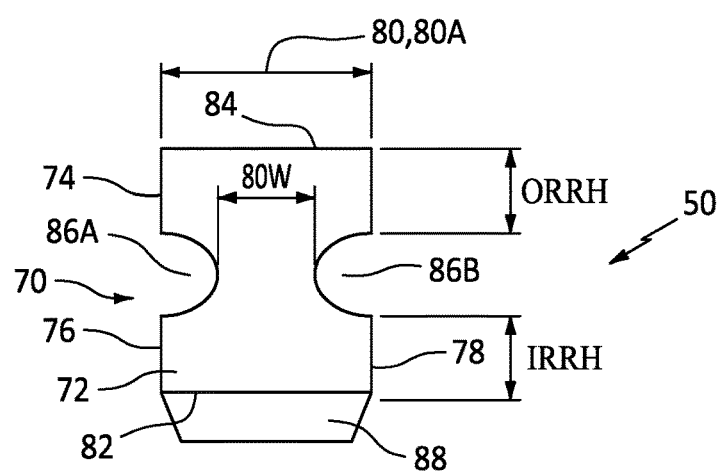
Figure 7D:
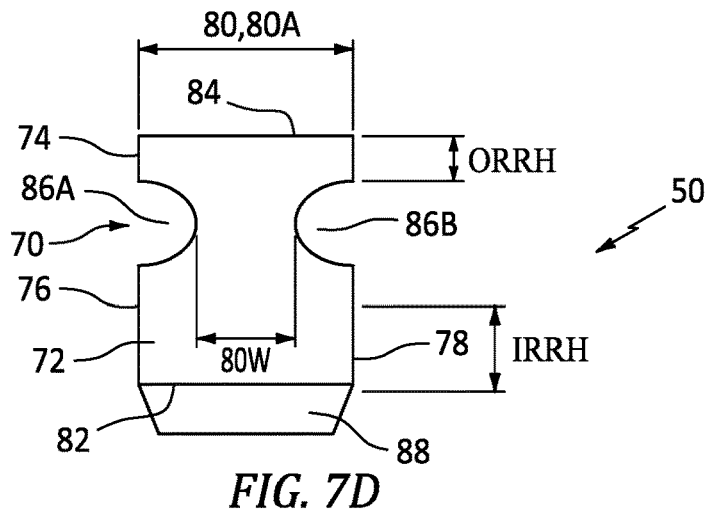
Figure 7E:
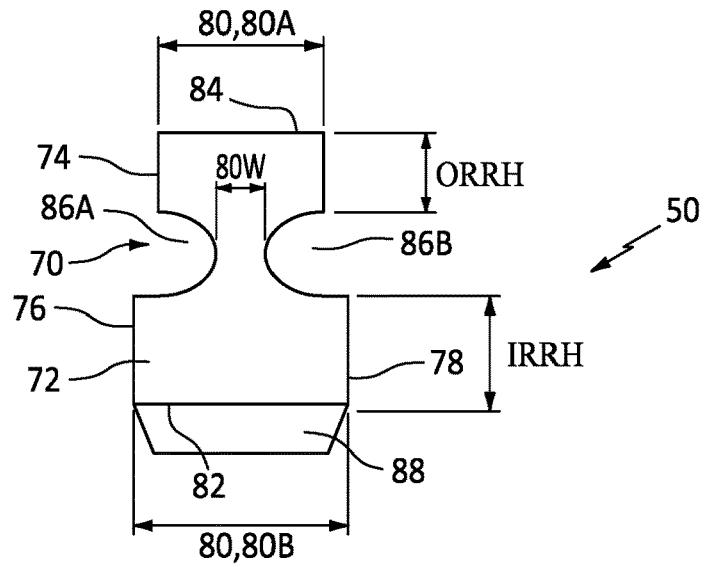
Figure 7F:
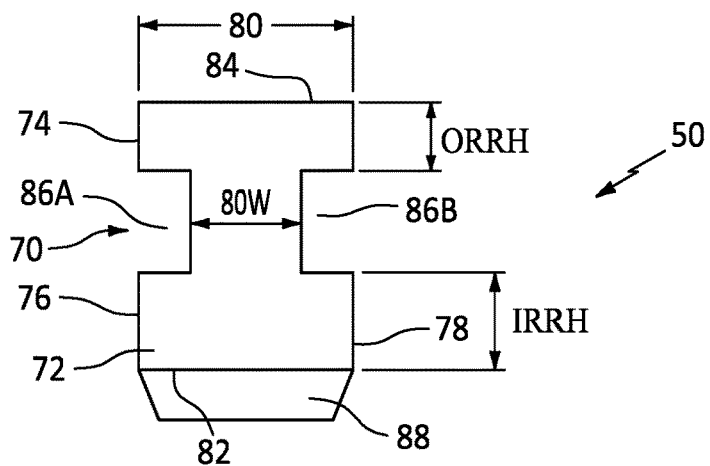

Referring to FIGS. 2 and 7A-7F, in those embodiments that include a pair of independent ring gears 50, the ring gears include a fore ring gear 50A and an aft ring gear 50B. Each ring gear 50A, 50B has a body that includes a web 70, an inner rim 72, an outer rim 74, a first lateral side surface 76, a second lateral side surface 78, and a width 80 (e.g., see FIGS. 7A and 7B). The width 80 extends between the lateral side surfaces 76, 78. The inner rim 72 is disposed radially inside of the outer rim 74. The web extends between the inner and outer rims 72, 74. The inner rim 72 has an inner radial surface 82 and the outer rim 74 has an outer radial surface 84. The teeth 88 that mesh with the fore and aft lateral gears 60, 62 extend radially inwardly from the inner radial surface 82 and may be described as having a pitch diameter ($P_{DRGFT}$). In some embodiments, the ring gears 50A, 50B may have the same width in the web 70, inner rim 72, and outer rim 74 (e.g., see FIG. 7A). In some embodiments, the ring gears 50A, 50B may have an outer rim 74 width 80A that differs from the inner rim width 80B; e.g., FIGS. 7B and 7E diagrammatically illustrate ring gear 50A, 50B embodiments wherein the outer rim width 80A is less than the inner rim width 80B. In some embodiments, the ring gears 50A, 50B may have an outer rim 74 and an inner rim 72 equal in width 80 and a web 70 that has a width 80W less than that of the rims; e.g., see FIGS. 7C, 7D, and 7F. In some embodiments, a ring gear body may include a first channel 86A disposed on first lateral side 76 of the ring gear body and a second channel 86B disposed on a second lateral side 78 of the ring gear body. The first and second channels 86A, 86B create a narrowed web 70 width. The "channels" may be any indentation relative to the lateral surfaces 76, 78 of the inner rim 72 or the outer rim 74, or both. The present disclosure is not limited to any particular channel 86A, 86B geometric configuration; e.g., FIGS. 7C, 7D, and 7E diagrammatically illustrate elliptical channels 86A, 86B and FIG. 7F diagrammatically illustrates rectangular channels 86A, 86B. The channels 86A, 86B may extend around the entire ring gear 50 circumference, or a plurality of circumferentially spaced apart channels may be included. The channels 86A, 86B may be centered between the inner and outer rims 72, 74 (e.g., see FIGS. 7C and 7E), or positioned closer to the outer rim 74 versus the inner rim 72, or vice versa; e.g., FIG. 7D illustrates the channels 86A, 86B disposed closer to the outer rim 74 than the inner rim 72. FIGS. 7C-7F diagrammatically illustrate an outer rim 74 having a radial height (ORRH), and an inner rim 72 having a radial height (IRRH). The outer rim 74 radial height (ORRH) may equal the inner rim 72 radial height (IRRH; e.g., see FIGS. 7C and 7E), or the outer rim 74 radial height (ORRH) may be less than the inner rim 72 radial height (IRRH; e.g., see FIGS. 7D and 7F), or the outer rim 74 radial height (ORRH) may be greater than the inner rim 72 radial height (IRRH).

Figure 8:
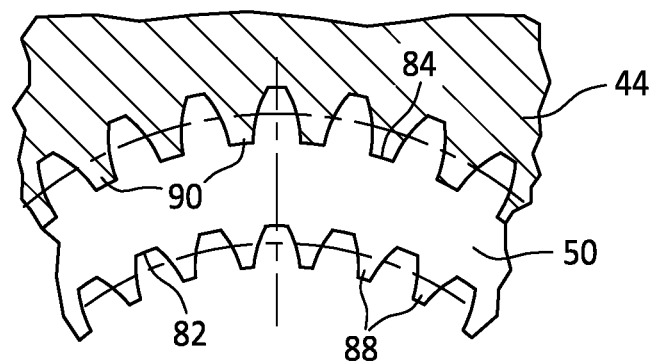
FIG. 8 is a diagrammatic view of a portion of a ring gear engaged with a reduction gearbox casing embodiment.
Figure 9:
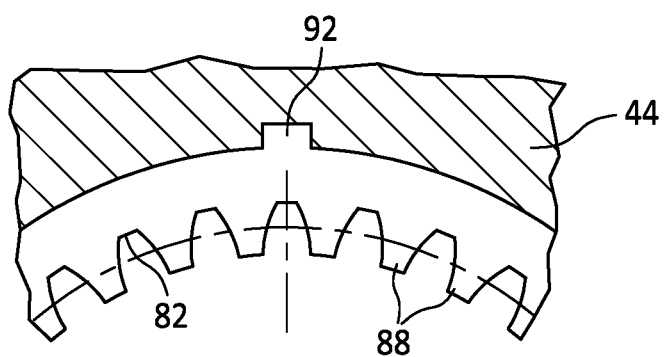
FIG. 9 is a diagrammatic view of a portion of a ring gear engaged with a reduction gearbox casing embodiment.
Figure 10:
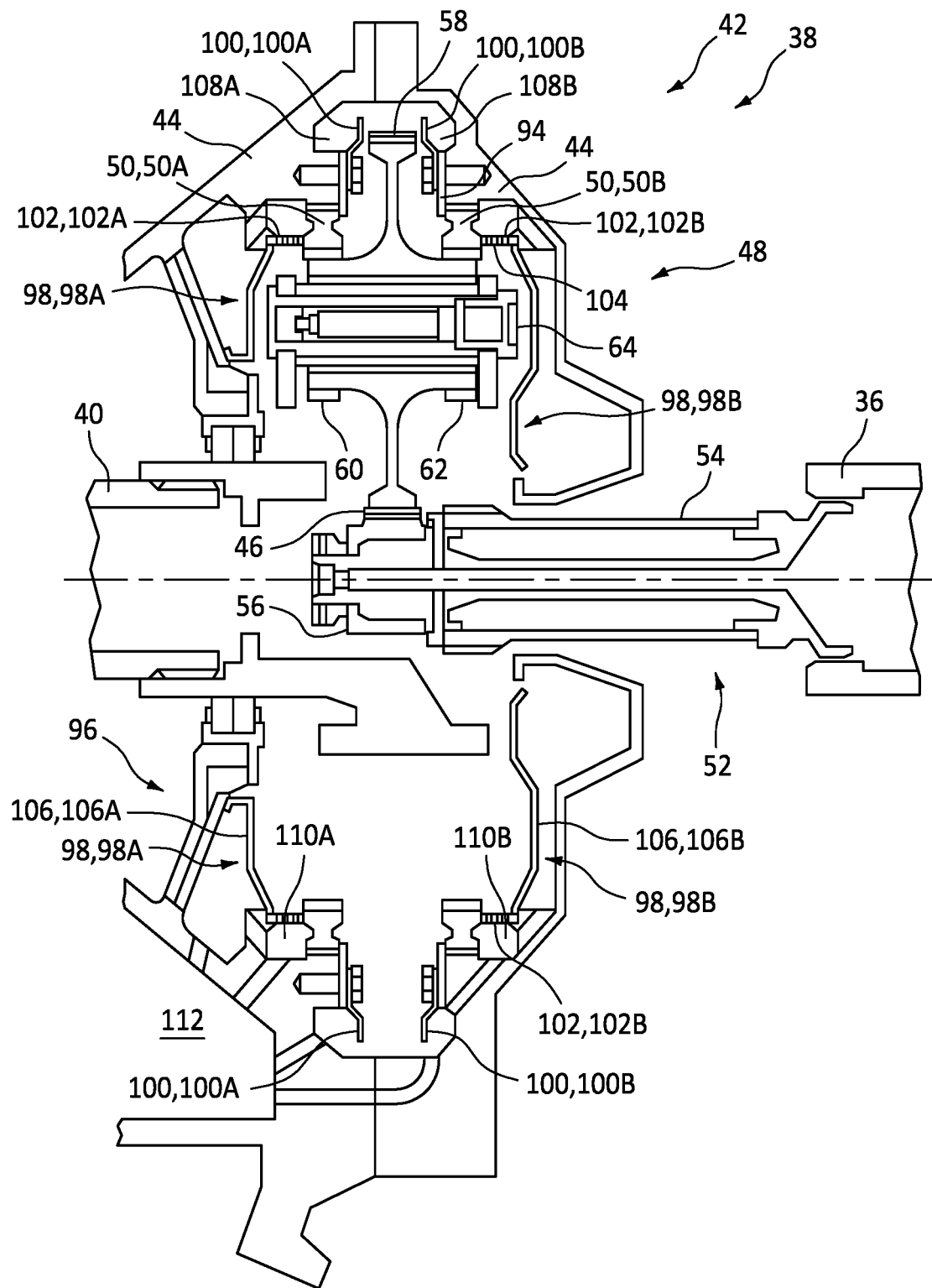
FIG. 10 is a diagrammatic sectional view of a reduction gearbox embodiment.

In some embodiments, the present disclosure reduction gearbox 38 may be configured so that the ring gears 50 are rotationally fixed and the planet gear assemblies 48 rotate relative to the fixed ring gears 50. In some of these embodiments, a plurality of second teeth 90 may extend radially outward from the outer radial surface 84 of the respective ring gear 50 and the stationary casing 44 is configured to mate with the second teeth 90 to secure the respective ring gear 50 from rotating; e.g., see FIG. 8. In some of these embodiments, one or more anti-rotation keys 92 may be engaged with the outer radial surface for engagement with the stationary casing 44 to prevent the respective ring gear 50 from rotating; e.g., rather than second teeth 90. The anti-rotation key 92 may include a male key extending radially out from the outer radial surface for engagement with a mating keyway disposed in the stationary casing 44 (e.g., see FIG. 9), or vice versa, or both the ring gear 50 and the stationary casing 44 may include aligned keyways and an independent key may be inserted within the aligned keyways. Referring to FIGS. 2 and 10, a retaining member 94 may be secured to the stationary casing 44 to maintain engagement between the ring gears 50 and the stationary casing 44.

In some embodiments, the present disclosure reduction gearbox 38 may be configured so that the ring gears 50 may be mounted for rotation relative to the stationary casing 44. For example, the ring gears 50 may be driven in a clockwise or counterclockwise direction at the same time the planet gear assemblies 48 are rotating relative to the ring gears 50. Rotation of the ring gears 50 may be used as a mechanism for controlling the relative rotations speeds of the input shaft 52 versus the output shaft 40; e.g., optimizing the rotational speed of a load 22 such as a propeller. A non-limiting example of how the ring gears 50 might be rotated relative to the stationary casing 44/planet gear assemblies 48 is a gear drive that is engaged with teeth that extend radially outward from the outer radial surface of the respective ring gear; e.g., the second teeth 90.

Figure 14:
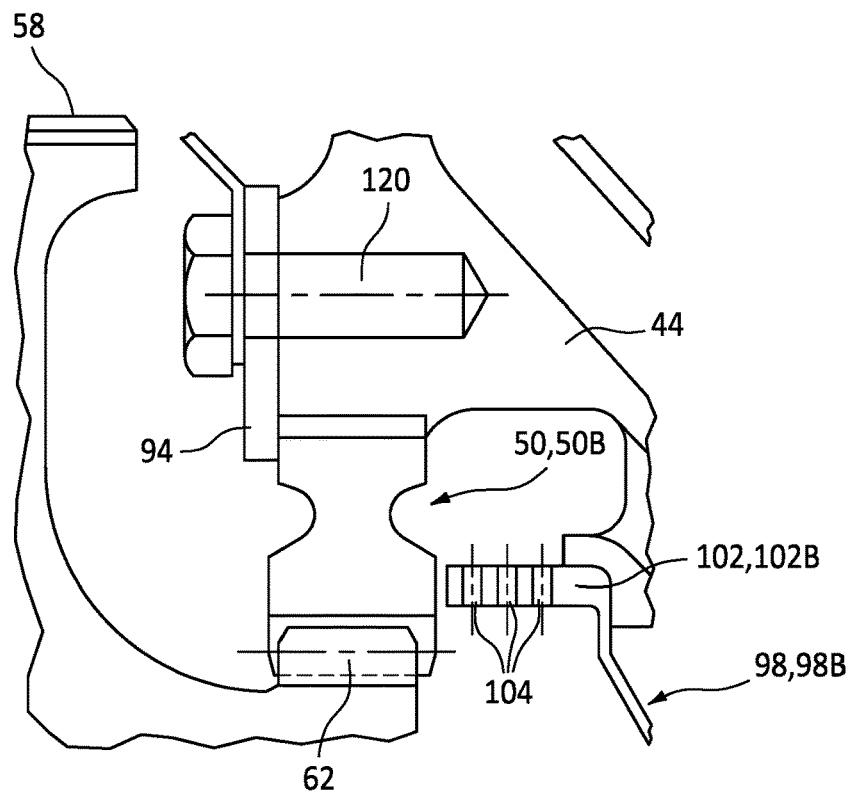
FIGS. 14-16 are enlarged views of ring gear embodiments engaged with the stationary casing.
Figure 15:
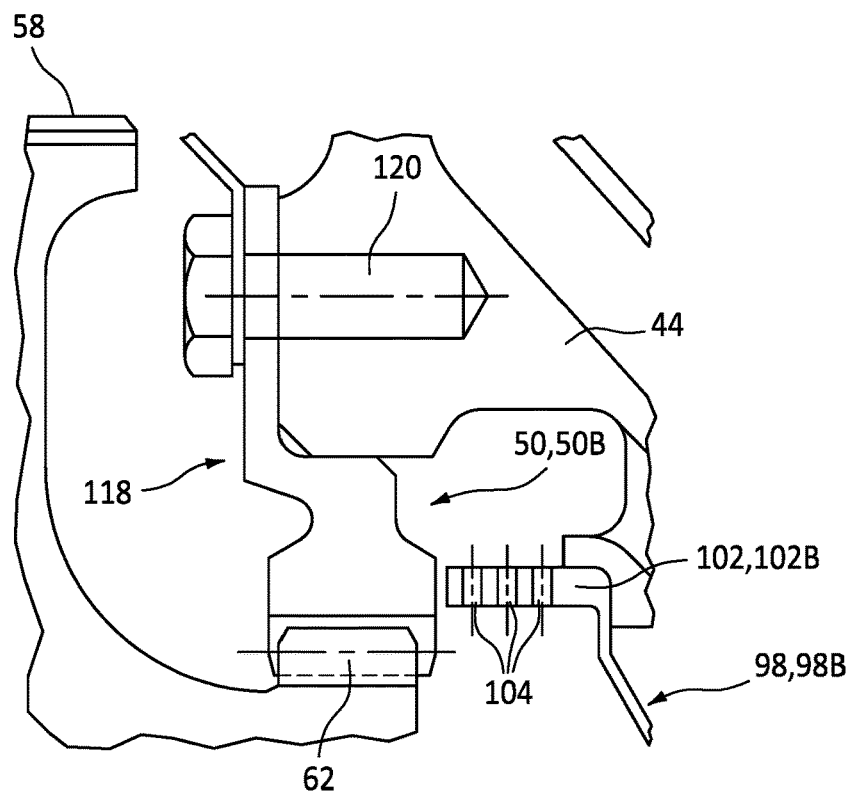
Figure 16:
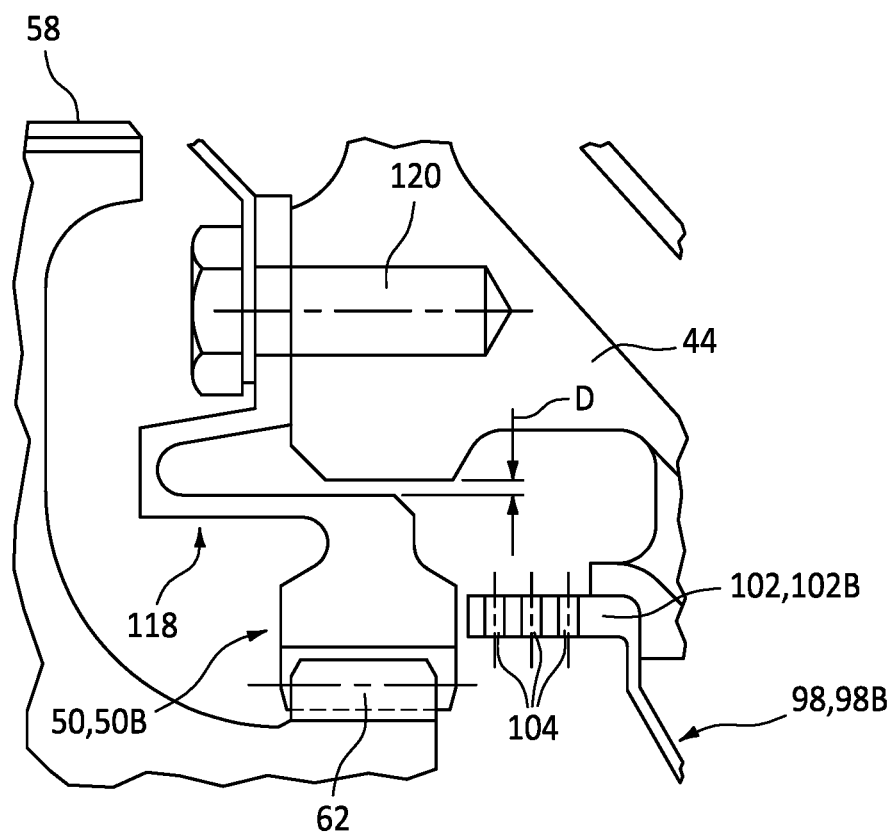

As indicated above and shown in FIGS. 2 and 8-10, in some embodiments the ring gears 50A, 50B may be mechanically engaged with the stationary casing 44 (e.g., via second teeth 90, an anti-rotation key 92, or the like) to fix the ring gears 50A, 50B relative to the stationary casing 44. This type of mechanical engagement between the ring gears 50A, 50B and the stationary casing 44 (which may be referred to as a "splined connection") provides a structure that is capable of reacting to the torque applied to the ring gears 50A, 50B by the planet gear assemblies 48. This type of mechanical engagement is also helpful in maintaining the concentricity of the ring gears 50A, 50B and the positions of the ring gears 50A, 50B relative to the stationary casing 44 and relative to one another (i.e., the "clocking" therebetween). In those embodiments that utilize second teeth 90 to provide the mechanical engagement between the ring gears 50A, 50B and the stationary casing 44, the second teeth 90 may be configured, for example as spur gear teeth or helical gear teeth. Second teeth 90 configured as helical teeth are configured to transfer loading from the ring gears 50A, 50B in a manner that has a circumferential load component and an axial load component. Depending upon the loading from the ring gears 50A, 50B and the orientation of the helical teeth, the helical teeth may facilitate the engagement between the respective ring gear 50A, 50B and the stationary casing 44, and/or may mitigate ring gear axial loading. FIG. 14 is an enlarged view of the mechanical engagement between the aft ring gear 50B and the stationary casing 44 shown in FIG. 10. As indicated herein, a retaining member 94 may be secured to the stationary casing 44 to maintain engagement between the ring gear 50B and the stationary casing 44. FIG. 15 illustrates an alternative mechanical engagement between the aft ring gear 50B and the stationary casing 44 wherein the aft ring gear 50B includes a plurality of flanges 118 fixed to the ring gear 50B. Mechanical fasteners 120 are used to attach the ring gear 50B to the stationary casing 44 via the flanges 118. In this embodiment, the ring gear body is positioned to abut the casing 44; i.e., an outer radial surface of the ring gear body is disposed contiguous with a casing surface. This embodiment obviates the need to provide mechanical engagement features (e.g., teeth, keys/keyways) in the ring gear 50 and in the stationary casing 44 and obviates the need for independent retaining members 94. FIG. 16 illustrates another alternative mechanical engagement between the aft ring gear 50B and the stationary casing 44 wherein the aft ring gear 50B includes a plurality of flanges 118. Mechanical fasteners 120 are used to attach the ring gear 50B to the stationary casing 44 via the flanges 118. In this embodiment, the flange 118 is configured to radially separate the ring gear 50 body from the stationary casing 44 by a defined distance "D". In this embodiment, the ring gear 50B may be described as being cantilevered. In the specific example shown in FIG. 16, the flange 118 includes a "U" shaped portion that radially separates the ring gear 50 body from the stationary casing 44 by the defined distance "D". The present disclosure is not limited to a flange 118 having a U-shaped portion to radially separate the ring gear 50 body from the stationary casing 44 by the defined distance "D". This flange 118 configuration provides the ring gear 50B with some amount of positional compliance that decreases the stiffness of the ring gear 50B. The positional compliance is understood to increase the ability of the ring gear 50B to accommodate misalignments that may occur during operation of the planetary gear arrangement 42.

The mechanical engagement embodiments between the ring gear 50 and the stationary casing 44 described above and shown in FIGS. 14-16 is detailed in terms of the aft ring gear 50B. The same mechanical engagement embodiments may be used for the fore ring gear 50A, the aft ring gear 50B, or both.

The sun gear 46, planet gear assemblies 48, and the ring gears 50A, 50B are arranged in a planetary or epicyclic arrangement. The sun gear 46 is disposed centrally with the planet gear assemblies 48 disposed radially outside of the sun gear 46. The main gear 58 of each planet gear assembly 48 is aligned with the sun gear 46 and meshes with the sun gear 46. The fore ring gear 50A is aligned with and meshes with the fore lateral gear 60 of each planet gear assembly 48. The aft ring gear 50B is aligned with and meshes with the aft lateral gear 62 of each planet gear assembly 48. Hence, the ring gears 50A, 50B are disposed symmetrically on each side of the main gears 58 so that the reaction load on the bearings 68 is equalized along the rotational axis of the respective planet gear assembly 48. By having two ring gears 50A, 50B disposed on opposite sides of the main gears 58, the load is symmetrically distributed relative to a plane P shown in FIG. 2, to which an axis of rotation A of the sun gear 46 is normal. Plane P is located halfway through a thickness of the main gears 58. By symmetrically distributing the load, the planetary gear arrangement 42 may be configured to withstand higher torques and may be configured to use a bearing 68 type (e.g., a journal bearing) that is lighter and less expensive than a rolling element bearing. In those embodiments wherein the lateral gears 60, 62 are helical gears with opposite orientations, during operation of the planetary gear arrangement 42, the lateral gears 60, 62 facilitate self-centering of the main gears 58 of the planet gear assemblies 48 under torque relative to the sun gear 46. This may enhance the load sharing between the ring gears 50A, 50B.

The pitch diameter ($P_{DSG}$) of the sun gear 46 is inferior to the pitch diameter ($P_{DMG}$) of the main gear 58 of each planet gear assembly 48. The pitch diameter of the lateral gears 60, 62 ($P_{DLG}$) of a respective planet gear assembly 48 is inferior to the pitch diameter ($P_{DMG}$) of the main gear 58 of that planet gear assembly 48. The pitch diameter of the lateral gears 60, 62 ($P_{DLG}$) in each planet gear assembly 48 is inferior to the pitch diameter ($P_{DRGFT}$) of the first teeth 88 of each ring gear 50. As stated above, the present disclosure planetary gear arrangement 42 allows a load 22 (e.g., a propeller, a rotor blade, or the like) to be driven at a given rotational speed that is different from the rotational speed of the low-pressure turbine. More specifically, the respective pitch diameters of the planetary gear assembly components can be chosen for a given application that permits the gas turbine engine 20 to operate (i.e., low-pressure shaft 36 rotational speed) in a predetermined range that is optimal for the engine 20, and that permits the load 22 (e.g., propeller, rotor blade, and the like) to be driven in a predetermined range that is optimal for the load 22. For example, the planetary gear arrangement 42 can be configured to enable a propeller to be driven in a quieter mode. The present disclosure planetary gear arrangement 42 is configured to produce a rotational speed reduction ratio between the input shaft 52 (in communication with the engine low-pressure shaft 36) and the output shaft 40 (in communication with the load 22) in the range of about 6:1 to about 22:1. Present disclosure planet gear assembly 48 embodiments may have a ratio of main gear pitch diameter ($P_{DMG}$) to lateral gear pitch diameter ($P_{DLG}$) in the range of about 1:6.

The present disclosure reduction gearbox 38 is described above having a planetary gear arrangement 42 disposed within a stationary casing 44 with the planet gear assemblies 48 in communication (e.g., via a planet carrier 66) with the output shaft 40. In alternate embodiments, the present disclosure reduction gearbox 38 may be configured as a star arrangement that utilizes the planet gear assemblies 48 described above with the planet carrier 66 rotationally fixed and the output shaft 40 operatively connected to rotating ring gears 50. In this alternate embodiment, the output shaft 40 and the input shaft 52 rotate in opposite directions.

To change the rotational speed of the output shaft 40 relative to the input shaft 52, the reduction gearbox 38 first receives a torque of the low-pressure shaft 36 via the sun gear 46. Then, the torque is transmitted to main gears 58 of the planet gear assemblies 48 meshed with the sun gear 46 and the fore and aft lateral gears 60, 62 as well. A first rotational speed ratio is generated by having the pitch diameter of the sun gear 46 ($P_{DSG}$) inferior to the pitch diameter of the main gears 58 ($P_{DMG}$). The torque is then transmitted to the planet carrier 66 (e.g., when the ring gears 50A, 50B are rotationally fixed and meshed with the fore and aft lateral gears 60, 62), or to the ring gears 50A, 50B (when the ring gears 50A, 50B are rotational, meshed with the fore and aft lateral gears 60, 62, and the planet carrier 66 is non-rotational). A second rotational speed ratio is generated by having the pitch diameter of the fore and aft lateral gears 60, 62 ($P_{DLG}$) inferior to the pitch diameter of the main gear 58 ($P_{DMG}$). The respective pitch diameters ($P_{DSG}$, $P_{DMG}$, $P_{DLG}$) may be selected to achieve the desired reduction ratio.

The planetary gear arrangement 42 within the present disclosure reduction gearbox 38 is provided with a constant oil flow from the engine lubrication system to ensure appropriate lubrication and cooling to the planetary gear arrangement 42 components; e.g., journal bearings, gear meshes, and the like. Unless addressed, the rotating gears subject to the oil can produce undesirable windage and churning within the casing 44 which in turn negatively affects oil scavenging from the reduction gearbox 38 and can substantially increase the temperature of the oil.

Figure 11:
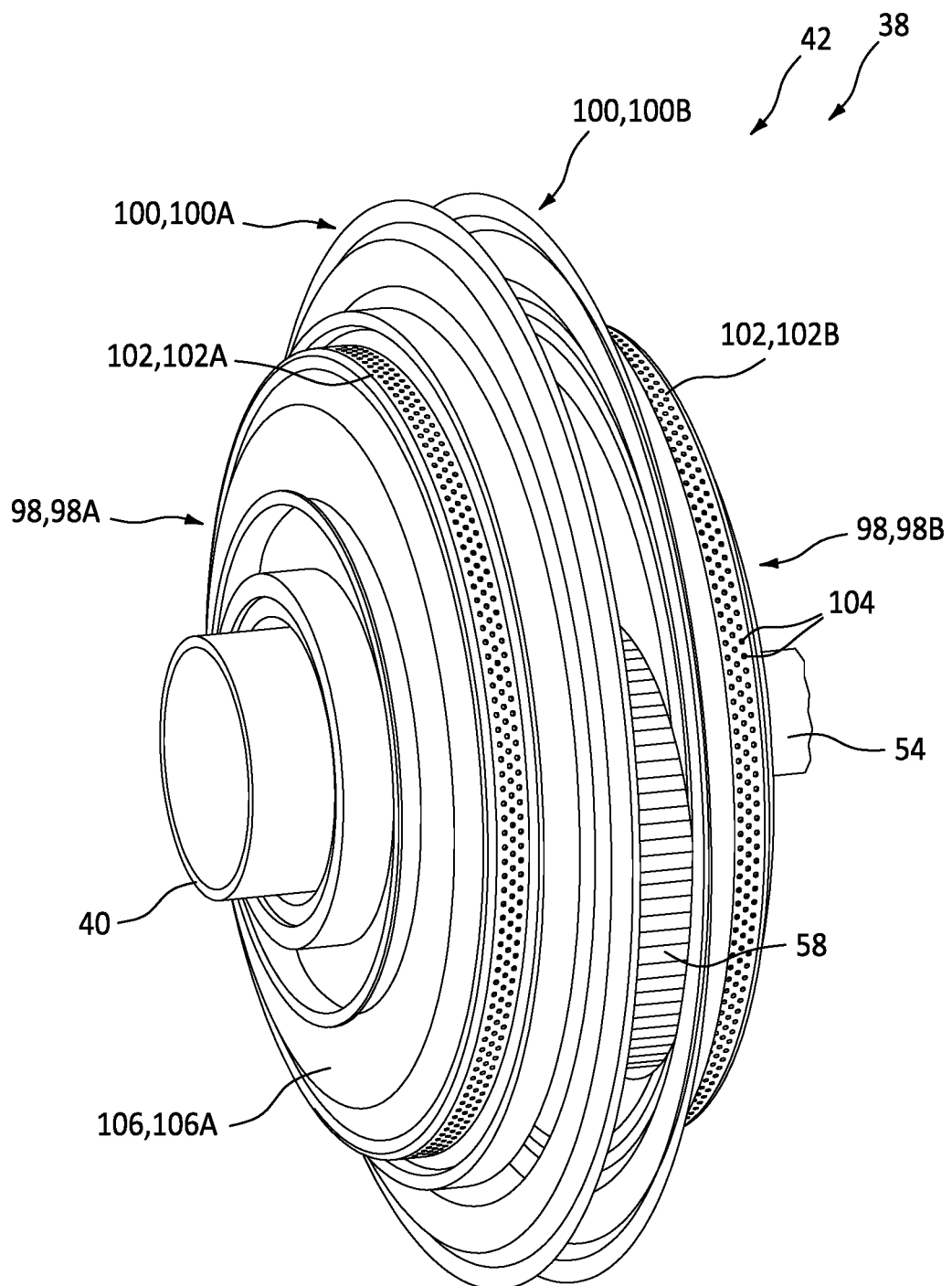
FIG. 11 is a diagrammatic perspective view of a planetary gear arrangement.
Figure 12:
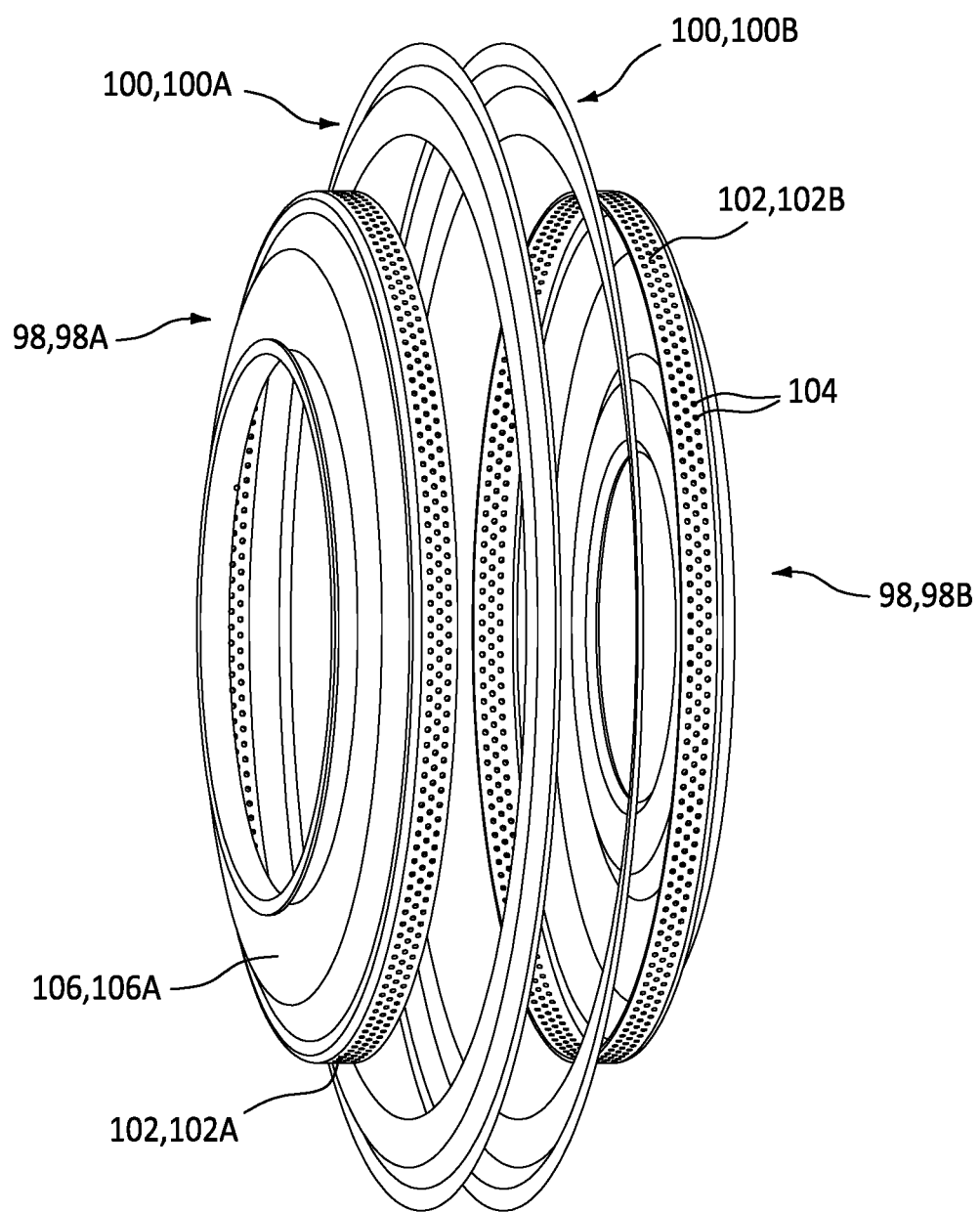
FIG. 12 is a diagrammatic view of baffle embodiments of a lubrication oil handling system.
Figure 13:
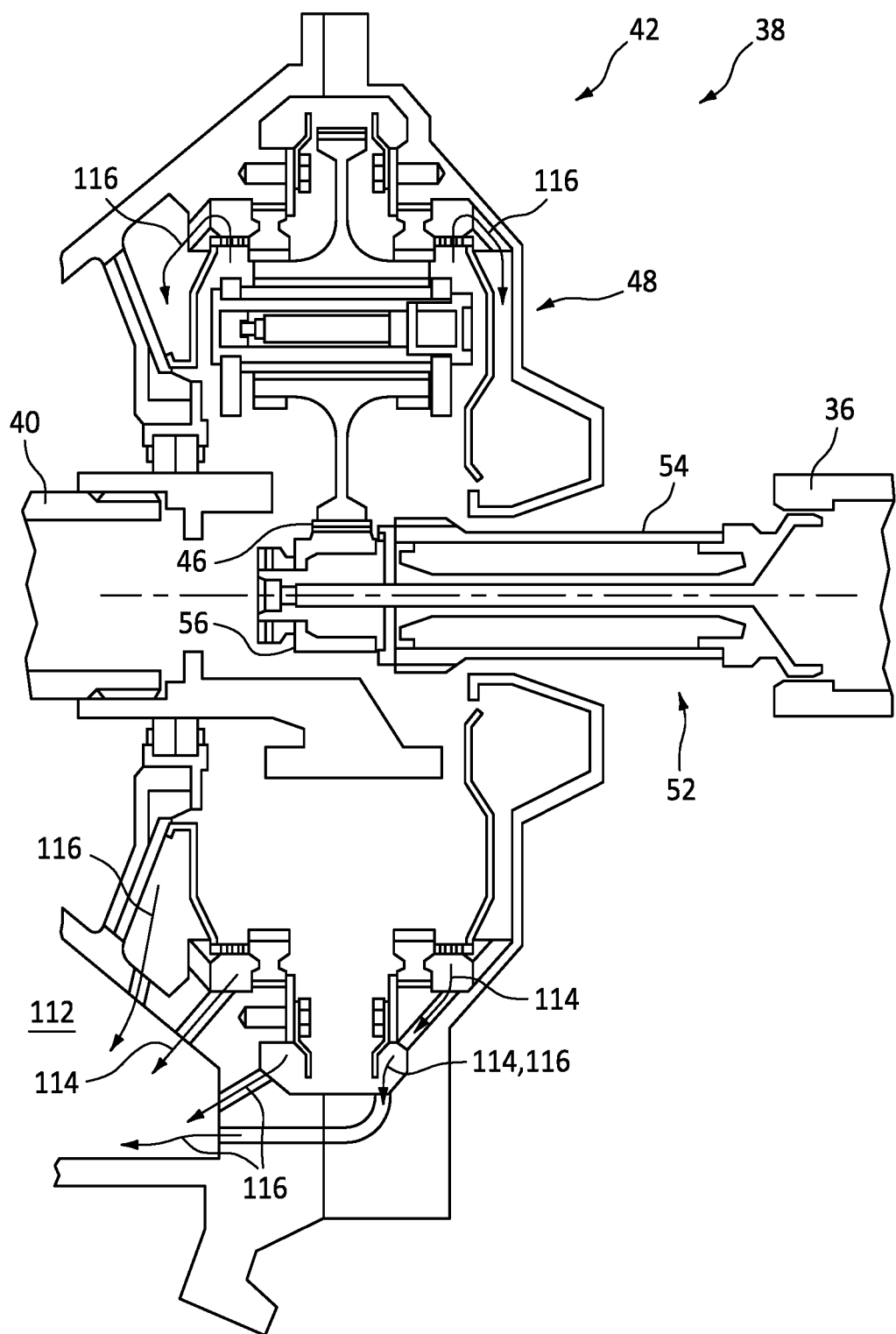
FIG. 13 is the diagrammatic sectional view of the reduction gearbox embodiment shown in FIG. 10, illustrating oil travel paths.

Referring to FIGS. 11-13, embodiments of the present disclosure reduction gearbox 38 include a lubrication oil handling system 96 that is understood to improve lubrication of planetary gear arrangement 42 components, reduce windage and churning, and reduce consequent increase in lubrication oil temperature. The oil handling system 96 includes a plurality of baffles configured to contain oil and to decrease oil velocity within the casing 44, and a plurality of cavities and passages that collect and direct oil to a scavenge cavity where it is removed (e.g., by a scavenge pump) and returned to the engine lubrication system. The plurality of baffles may include a first set of gear baffles 98 and a second set of gear baffles 100.

The first set of gear baffles 98 includes a fore ring gear baffle 98A disposed proximate the fore ring gear 50A, and an aft ring gear baffle 98B disposed proximate the aft ring gear 50B. The fore and aft ring gear baffles 98A, 98B each include an axially and circumferentially extending first segment 102A, 102B that includes a plurality of apertures 104 sized to permit oil flow therethrough. The apertures 104 may be disposed around the entire circumference of the respective first segment 102A, 102B, or they may be disposed in certain circumferential regions of the respective first segment 102A, 102B (e.g., gravitationally lower regions) to facilitate directing oil for scavenging purposes. The fore ring gear baffle 98A includes a second segment 106A connected to the first segment 102A that extends radially inward substantially enclosing the forward side of the planetary gear arrangement 42. In similar fashion, the aft ring gear baffle 98B includes a second segment 106B connected to its first segment 102B that extends radially inward substantially enclosing the aft side of the planetary gear arrangement 42.

In some embodiments, the axially extending first segments 102A, 102B of the fore and aft ring gear baffles 98A, 98B within the first set of ring gear baffles may also operate to facilitate axial seating of the respective ring gear 50, reacting against axial force component acting on the respective ring gear 50. For example, the first segment 102A of the fore ring gear baffle 98A may be configured to constrain axial movement of the fore ring gear 50A, and the first segment 102B of the aft ring gear baffle 98B may be configured to constrain axial movement of the aft ring gear 50B.

The second set of gear baffles 100 includes a fore main gear baffle 100A disposed on the forward side of the planetary gear arrangement main gears 58 and an aft main gear baffle 100B disposed on the aft side of the main gears 58, collectively substantially enclosing an outer radial portion of the main gears 58 (i.e., the portion of the main gears 58 extending radially outside of the ring gears 50A, 50B) as they rotationally travel around the sun gear 46. The fore main gear baffle 100A extends circumferentially within the reduction gearbox casing 44 and radially to define a fore outer cavity 108A disposed radially outside of the main gears 58. The aft main gear baffle 100B extends circumferentially within the reduction gearbox casing 44 and radially to define an aft outer cavity 108B disposed radially outside of the main gears 58.

As stated above, during operation of the reduction gearbox 38 a constant oil flow from the engine lubrication system is provided to the reduction gearbox 38. The first and second sets of gear baffles 98, 100 collect oil exiting from the geartrain journal bearings and gear meshes, after being entrained in rotation. The apertures 104 disposed in the first segments 102A, 102B of the first set of gear baffles 98 slow down the oil velocity and direct the oil to intermediate cavities (e.g., a fore intermediate cavity 110A and an aft intermediate cavity 110B) disposed on the fore and aft side of the planetary gear arrangement 42. The intermediate cavities 110A, 110B drain to a scavenge cavity 112 where the oil is drawn back into the engine lubrication system to repeat the flow cycle. Arrows 114 diagrammatically illustrate the oil travel path as relates to the first set of gear baffles 98. The second set of gear baffles 100 help to avoid any remaining oil from being re-energized by the rotating/orbiting planet gear assemblies 48 and redirect any collected oil into outer cavities (e.g., a fore outer cavity 108A and an aft outer cavity 108n), which also drain to the scavenge cavity 112. Arrows 116 diagrammatically illustrate the oil travel path as relates to the second set of gear baffles 100. In this manner, the lubrication oil handling system (including the first and second sets of gear baffles 98, 100, the intermediate and outer cavities 110, 108, and the passages leading to the scavenge cavity 112) is understood to improve lubrication of planetary gear arrangement 42 components, reduce windage and churning, reduce consequent increase in lubrication oil temperature, and reduce paralytic losses thereby leading to an increase in engine efficiency.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A reduction gearbox, comprising:
a casing; and
a planetary gear arrangement disposed in the casing, the planetary gear arrangement having:
a sun gear configured for communication with an input;
a plurality of planet gear assemblies, each planet gear assembly having a main gear meshed with the sun gear, a fore lateral gear and an aft lateral gear disposed on opposite sides of the main gear and rotating therewith, the main gear having a main gear pitch diameter and the fore and aft lateral gears having a lateral gear pitch diameter; and
a fore ring gear meshed with the fore lateral gears; and
an aft ring gear meshed with the aft lateral gears, wherein the aft ring gear is independent of the fore ring gear;
wherein the plurality of planet gear assemblies are in communication with an output; and
wherein the fore ring gear and the aft ring gear are mechanically engaged with the casing, and the fore ring gear and the aft ring gear each have an outer radial surface, and each include one or more male mechanical features that extend outwardly from the outer radial surface and engage with respective mating female features disposed within the casing.

2. The reduction gearbox of claim 1, wherein the one or more male mechanical features are gear teeth disposed around a circumference of the respective ring gear, and the respective mating female features are configured to receive the gear teeth.

3. The reduction gearbox of claim 2, wherein the gear teeth are configured as spur gear teeth.

4. The reduction gearbox of claim 3, wherein the gear teeth extending outwardly from the outer radial surface of the fore ring gear and the gear teeth extending outwardly from the outer radial surface of the aft ring gear are configured to permit circumferential clocking alignment between the fore ring gear and the aft ring gear.

5. The reduction gearbox of claim 2, wherein the gear teeth are configured as helical gear teeth.

6. The reduction gearbox of claim 5, wherein the gear teeth extending outwardly from the outer radial surface of the fore ring gear and the gear teeth extending outwardly from the outer radial surface of the aft ring gear are configured to permit circumferential clocking alignment between the fore ring gear and the aft ring gear.

7. The reduction gearbox of claim 1, wherein the one or more male mechanical features is a key extending out from the outer radial surface of the respective ring gear and the respective mating female features disposed within the casing is a keyway disposed in the casing that mates with the key.

8. The reduction gearbox of claim 1, wherein the fore ring gear and the aft ring gear each include an attached flange configured for attachment to the casing using a mechanical fastener.

9. The reduction gearbox of claim 8, wherein the attached flange is configured such that an outer radial surface of the respective ring gear abuts the casing.

10. The reduction gearbox of claim 8, wherein the attached flange is configured such that an outer radial surface of the respective ring gear is separated a distance from the casing.

11. The reduction gearbox of claim 10, wherein the attached flange has a U-shaped portion.

12. A reduction gearbox, comprising:
a casing; and
a planetary gear arrangement disposed in the casing, the planetary gear arrangement having:
a sun gear configured for communication with an input;
a plurality of planet gear assemblies, each planet gear assembly having a main gear meshed with the sun gear, a fore lateral gear and an aft lateral gear disposed on opposite sides of the main gear and rotating therewith, the main gear having a main gear pitch diameter and the fore and aft lateral gears having a lateral gear pitch diameter; and
a fore ring gear meshed with the fore lateral gears; and
an aft ring gear meshed with the aft lateral gears, wherein the aft ring gear is independent of the fore ring gear;
wherein the plurality of planet gear assemblies are in communication with an output; and
wherein the fore ring gear and the aft ring gear are mechanically engaged with the casing; and
wherein the fore ring gear and the aft ring gear each have an outer radial surface, and each include a keyway disposed in the outer radial surface, and the casing includes a first key configured to be received within the keyway of the fore ring gear and a second key configured to be received within the keyway of the aft ring gear.

13. A reduction gearbox, comprising:
a casing; and
a planetary gear arrangement disposed in the casing, the planetary gear arrangement having:
a sun gear configured for communication with an input;
a plurality of planet gear assemblies, each planet gear assembly having a main gear meshed with the sun gear, a fore lateral gear and an aft lateral gear disposed on opposite sides of the main gear and rotating therewith, the main gear having a main gear pitch diameter and the fore and aft lateral gears having a lateral gear pitch diameter; and a fore ring gear meshed with the fore lateral gears; and an aft ring gear meshed with the aft lateral gears, wherein the aft ring gear is independent of the fore ring gear;

wherein the plurality of planet gear assemblies are in communication with an output; and wherein the fore ring gear and the aft ring gear each are attached to the casing by a flange, the respective flange extending out from the respective ring gear in a manner such that the respective ring gear is separated a distance from the casing; and wherein the respective flange has a U-shaped portion.

14. A gas turbine engine, comprising:

a compressor;

a combustor;

a turbine in communication with the compressor and a reduction gearbox, the reduction gearbox including:

a casing; and a planetary gear arrangement disposed in the casing, the planetary gear arrangement having:

a sun gear configured for communication with an input;

a plurality of planet gear assemblies, each planet gear assembly having a main gear meshed with the sun gear, a fore lateral gear and an aft lateral gear disposed on opposite sides of the main gear and rotating therewith, the main gear having a main gear pitch diameter and the fore and aft lateral gears having a lateral gear pitch diameter; and a fore ring gear meshed with the fore lateral gears; and an aft ring gear meshed with the aft lateral gears, wherein the aft ring gear is independent of the fore ring gear;

wherein the plurality of planet gear assemblies are in communication with an output; and wherein the fore ring gear and the aft ring gear are mechanically engaged with the casing; and wherein the fore ring gear and the aft ring gear each have an outer radial surface, and each include one or more male mechanical features that extend outwardly from the outer radial surface and engage with respective mating female features disposed within the casing.

15. The gas turbine engine of claim 14, wherein the one or more male mechanical features are gear teeth disposed around a circumference of the respective ring gear, and the respective mating female features are configured to receive the gear teeth.

* * * * *